(12) United States Patent
De Israeli

(10) Patent No.: US 12,024,303 B2
(45) Date of Patent: Jul. 2, 2024

(54) METHOD FOR CONVERTING AN AIRPLANE WITH A COMBUSTION ENGINE TO AN ELECTRICAL REACTION PROPULSION AIRPLANE

(71) Applicant: Luca De Israeli, Kiryat Haim (IL)

(72) Inventor: Luca De Israeli, Kiryat Haim (IL)

( * ) Notice: Subject to any disclaimer, the term of this patent is extended or adjusted under 35 U.S.C. 154(b) by 0 days.

(21) Appl. No.: 18/257,486

(22) PCT Filed: Dec. 15, 2022

(86) PCT No.: PCT/IL2022/051331
§ 371 (c)(1),
(2) Date: Jun. 14, 2023

(87) PCT Pub. No.: WO2023/112034
PCT Pub. Date: Jun. 22, 2023

(65) Prior Publication Data
US 2023/0415904 A1    Dec. 28, 2023

(30) Foreign Application Priority Data

Dec. 19, 2021 (IL) .......................... 289148

(51) Int. Cl.
*B64D 25/00*    (2006.01)
*B64D 27/24*    (2024.01)
*B64D 41/00*    (2006.01)

(52) U.S. Cl.
CPC ............ *B64D 27/24* (2013.01); *B64D 25/00* (2013.01); *B64D 2041/002* (2013.01)

(58) Field of Classification Search
CPC ... B64D 27/24; B64D 25/00; B64D 2041/002
(Continued)

(56) References Cited

U.S. PATENT DOCUMENTS 3,455,182 A * 7/1969 Kelley .................... B64C 27/12
                                                     244/17.11
5,377,934 A    1/1995 Hill
(Continued)

FOREIGN PATENT DOCUMENTS

EP       3772462 A1    2/2021
EP       3569507 B1    11/2021
WO   WO-2020183492 A1 * 9/2020 ............... B60K 6/26

OTHER PUBLICATIONS

Forest River Forums, https://www.forestriverforums.com/forums/f218/running-12-volt-electric-lines-alongside-gas-lines-243579.html, Nov. 23, 2021, last visited on Oct. 18, 2023. (Year: 2021).*

*Primary Examiner* — Brady W Frazier
(74) *Attorney, Agent, or Firm* — Roach Brown McCarthy & Gruber, P.C.; Kevin D. McCarthy

(57) ABSTRACT

A method for converting a conventional airplane having at least one thermic reaction propulsion engine and at least one fuel tank fluidly connected through fuel pipes to an electric propulsion airplane comprises: removing the at least one thermic reaction propulsion engine from the conventional airplane; replacing the at least one thermic reaction propulsion engine used for propelling the conventional airplane with at least one electric engine; removing the at least one fuel tank from the conventional airplane; implanting at least one rechargeable battery instead of the at least one fuel tank; and electrically connecting the at least one electric engine and the at least one rechargeable battery.

17 Claims, 5 Drawing Sheets

(58) Field of Classification Search
USPC .......................................................... 244/53 R
See application file for complete search history.

(56) References Cited

U.S. PATENT DOCUMENTS

| | | | |
|---|---|---|---|
| 6,568,633 B2 | 5/2003 | Dunn | |
| 2010/0064689 A1 | 3/2010 | Reinhardt | |
| 2010/0293959 A1 | 11/2010 | Remy et al. | |
| 2012/0318913 A1* | 12/2012 | Filho | B64D 41/00 244/58 |
| 2014/0263820 A1* | 9/2014 | Smith | B64D 27/24 244/17.19 |
| 2014/0339371 A1 | 11/2014 | Yates et al. | |
| 2019/0345949 A1 | 11/2019 | Harvey | |
| 2021/0039801 A1 | 2/2021 | Spierling et al. | |
| 2021/0221526 A1 | 7/2021 | Van Bavel et al. | |
| 2021/0261260 A1* | 8/2021 | Miftakhov | B64D 27/26 |

* cited by examiner

METHOD FOR CONVERTING AN AIRPLANE WITH A COMBUSTION ENGINE TO AN ELECTRICAL REACTION PROPULSION AIRPLANE

CROSS-REFERENCE TO RELATED PATENT APPLICATIONS

This application is a National Phase filing under 35 U.S.C. § 371 of co-pending PCT Patent Application No. PCT/IL2022/051331, filed Dec. 15, 2022, which is based upon and claims the priority of Israeli Patent Application No. 289148, filed Dec. 19, 2021, each of which is incorporated herein by reference.

TECHNICAL FIELD

The present disclosed subject matter relates to electrical airplanes. More particularly, the present disclosed subject matter relates to conversion of conventional airplanes to electrical propulsion airplanes.

BACKGROUND OF THE INVENTION

With the growing oil price and environmental concerns, there is a need to provide electric airplane that are powered by rechargeable batteries. There is a large number of prior art airplanes that are using prior art thermic reaction propulsion engines that are thus becoming obsolete. There is a need to use those airplanes so as to prevent their waste.

BRIEF SUMMARY OF THE INVENTION

The current subject matter provides embodiments of converted electric airplane and methods of converting prior art airplanes to electric propulsion.

For ease of converting a prior art airplane of the prior art to electric propulsion, and to save cost, a small number of parts are replaced, and only few modifications are made. Most of the structure elements and functions of the prior art airplane remains unchanged. For example, at least one of the engines of a conventional airplane is replaced with electrical motor, and at least one fuel tank is replaced with a rechargeable battery to power the electric motor.

Therefore, it is provided in accordance with an embodiment of the present subject matter, a method for converting a conventional airplane having at least one thermic reaction propulsion engine and at least one fuel tank fluidly connected through fuel pipes to an electric propulsion airplane, the method comprising:

removing the at least one thermic reaction propulsion engine from the conventional airplane;
  replacing the at least one thermic reaction propulsion engine used for propelling the conventional airplane with at least one electric engine;
  removing the at least one fuel tank from the conventional airplane;
  implanting at least one rechargeable battery instead of the at least one fuel tank; and
  electrically connecting the at least one electric engine and the at least one rechargeable battery.

In accordance with another embodiment of the present subject matter, the electrically connecting the at least one electric engine and the at least one rechargeable battery is performed by wiring along the fuel pipes.

In accordance with another embodiment of the present subject matter, the electrically connecting the at least one electric engine and the at least one rechargeable battery is performed by wiring along frame structures of the airplane.

In accordance with another embodiment of the present subject matter, said removing the at least one fuel tank from the conventional airplane comprises removing main fuel tanks of the at least one fuel tank airplane in wings and in fuselage of the airplane.

In accordance with another embodiment of the present subject matter, said implanting at least one rechargeable battery comprises implanting the rechargeable batteries in wings and in fuselage of the airplane.

In accordance with another embodiment of the present subject matter, the method further comprises implanting at least one rechargeable battery in at least one freight hold of the airplane.

In accordance with another embodiment of the present subject matter, the method further comprises installing at least one rechargeable battery in a tail section of the airplane.

In accordance with another embodiment of the present subject matter, said removing the at least one thermic reaction propulsion engine from the airplane comprising removing the compressor which is a part of the thermic reaction propulsion engine; and further comprises installing an electrically driven compressor provide near-sea-level compression of the cockpit and the passenger compartment of the electric propulsion airplane.

In accordance with another embodiment of the present subject matter, the method further comprising installing an aerodynamic cone to create laminar flow of the exhaust air in the air outlet of the at least one electric engine (the exit jet may be turbulent).

In accordance with another embodiment of the present subject matter, the at least one thermic reaction propulsion engine is selected from a group consisting of turboprop engine and turbofan engine.

In accordance with another embodiment of the present subject matter, the method further comprising connecting at least one the electric propulsion engines to a compressor of the turboprop engine or turbofan engine, replacing the combustion chambers and the turbine of the turboprop engine or turbofan engine.

In accordance with another embodiment of the present subject matter, said compressor provides near-sea-level compression of a cockpit and a passenger compartment of the electric propulsion airplane.

In accordance with another embodiment of the present subject matter, the electric propulsion airplane further comprising an electrical generator, wherein said turboprop engine or turbofan engine comprises a variable pitch propeller hub for controlling the pitch of the propellor of said turboprop or turbofan engine for autorotation during at least one of: power outage emergency; and descent, and wherein power generated by the propeller during autorotation is used for at least one of: generating, during emergency, power for operating essential components of the airplane; and, during descent, generating electrical power for charging the at least one rechargeable battery.

In accordance with another embodiment of the present subject matter, the method further comprising providing an insert for reducing a size of an air intake of the turboprop engine or the turbofan engine.

In accordance with another embodiment of the present subject matter, the electric propulsion airplane is a turbofan engine and wherein the method further comprising providing a fuel operated auxiliary power unit for generating power for operating essential components of the airplane in emergency and when the at least one rechargeable battery is depleted.

An electric propulsion airplane is also provided that is converted from a conventional airplane according to the methods depicted herein before.

In accordance with another embodiment of the present subject matter, at least one of the at least one electric engine is used as the electrical generator.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

The features as indicated above can be combined individually or all together.

Figure 1A:
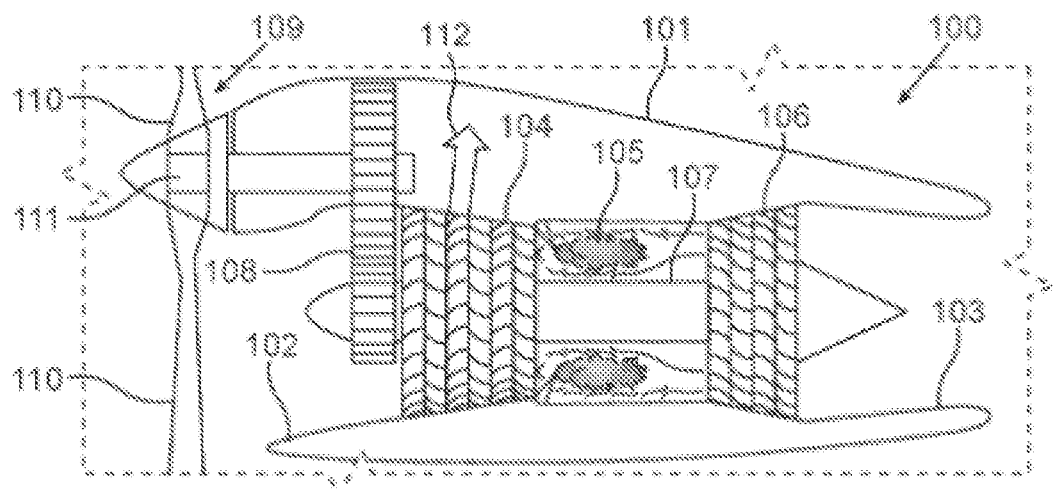

In discussion of the various figures described herein below, like numbers refer to like parts. Specifically, a numeral followed by a letter such as "a" or "b" may mark symmetrical, similar, or identical elements. So as to not clutter the drawing and/or the text, a numeral followed by the letter "x" will refer to any of the letters that follow that numeral in the drawing, for example, 100x can stand for any of 100a and 100b, etc.

Figure 1B:
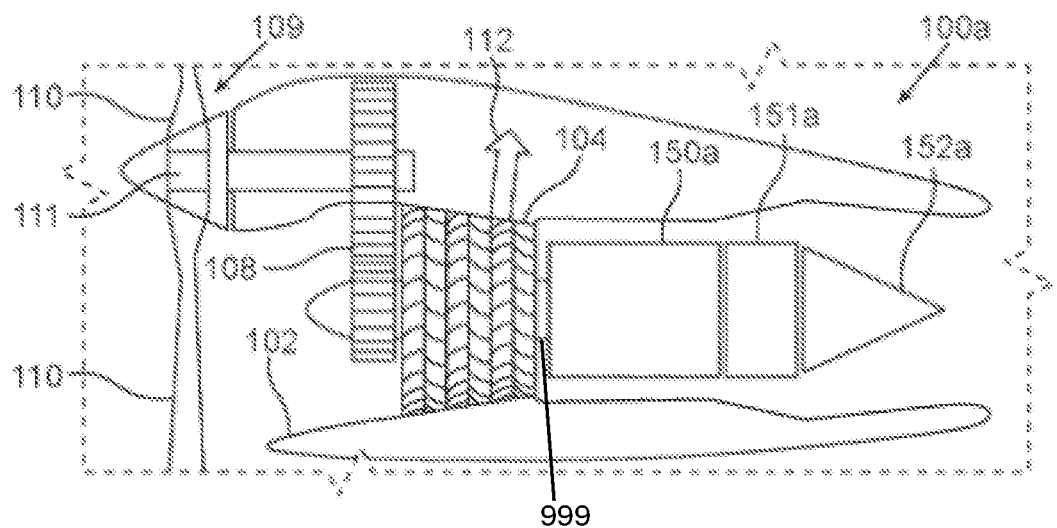
Figure 1C:
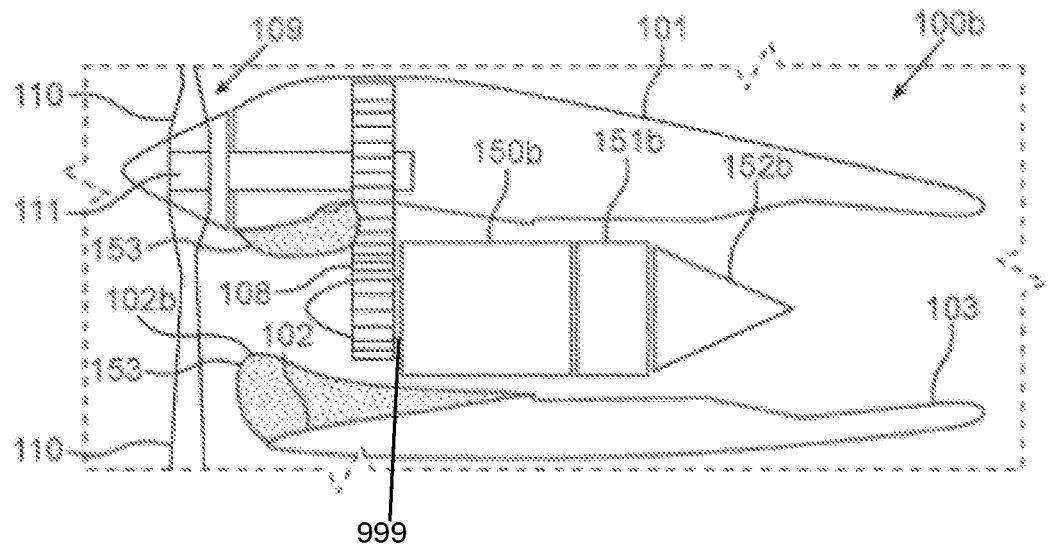
Figure 2A:
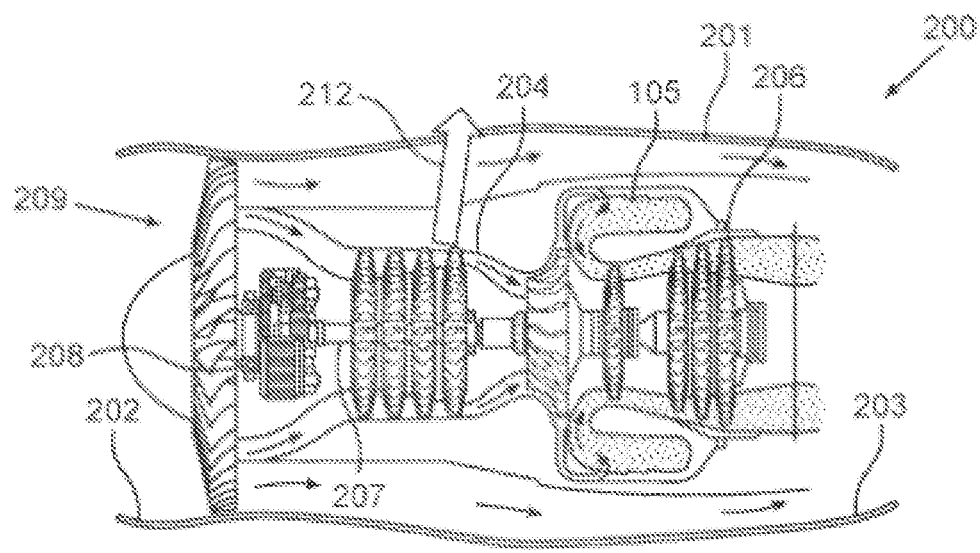
Figure 2B:
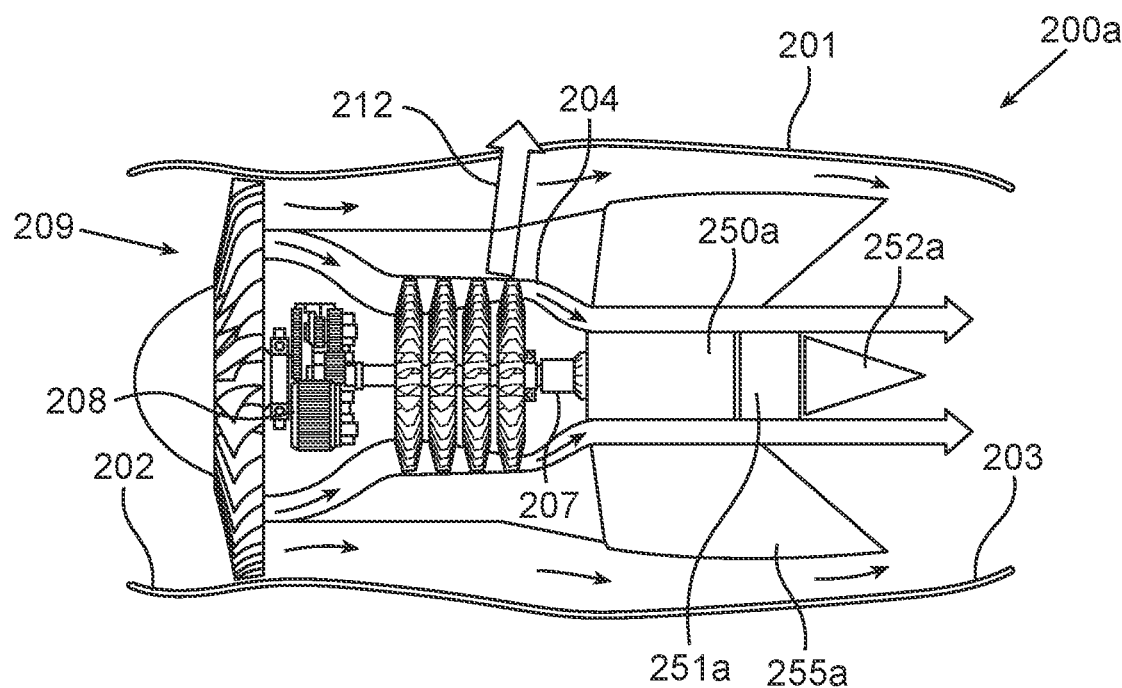
Figure 2C:
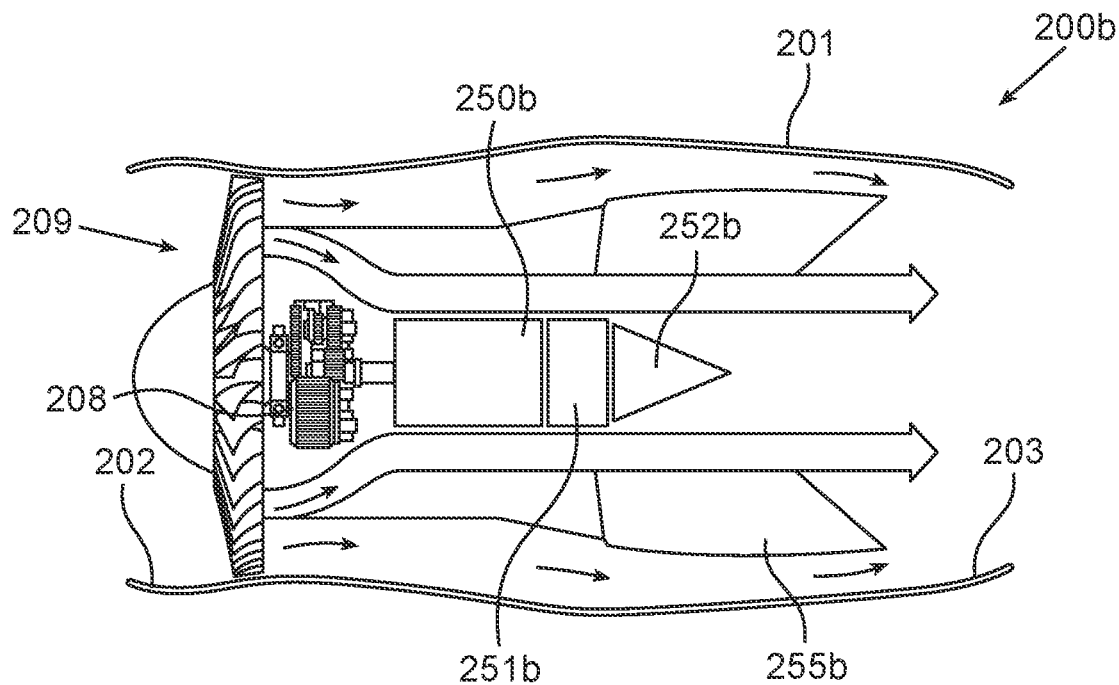
Figure 3A:
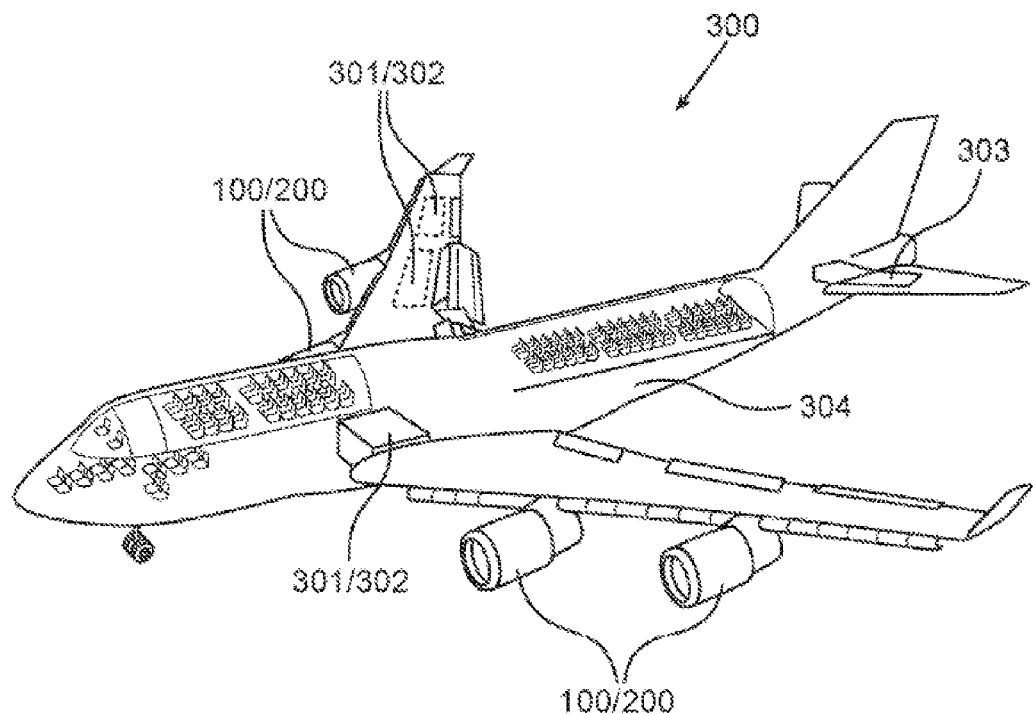
Figure 3B:
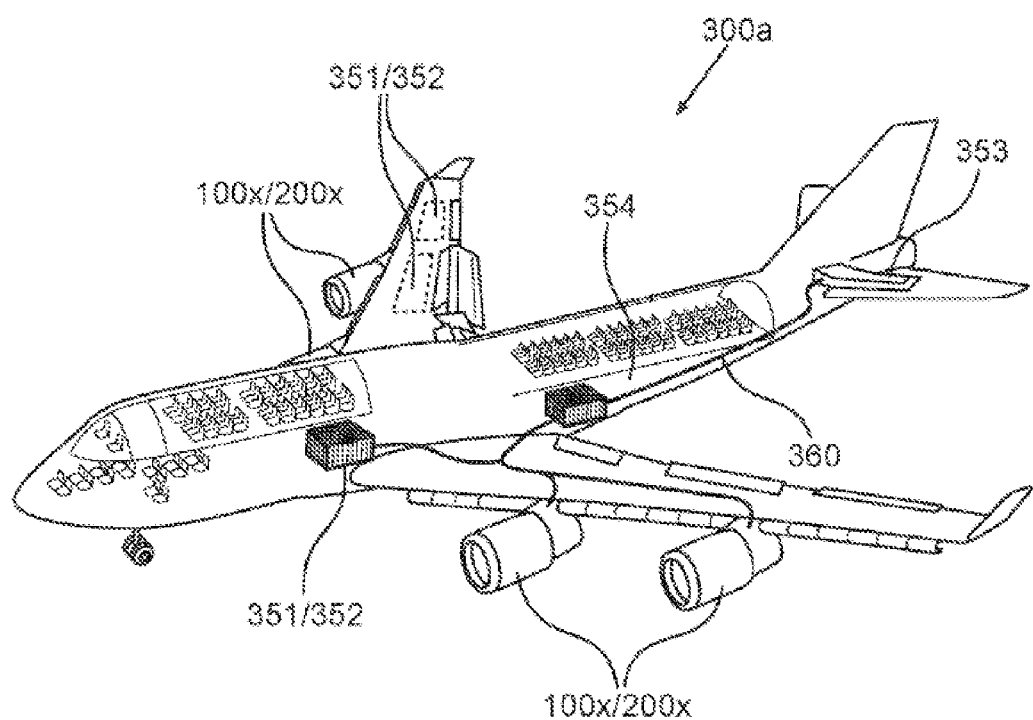
Figure 4I:
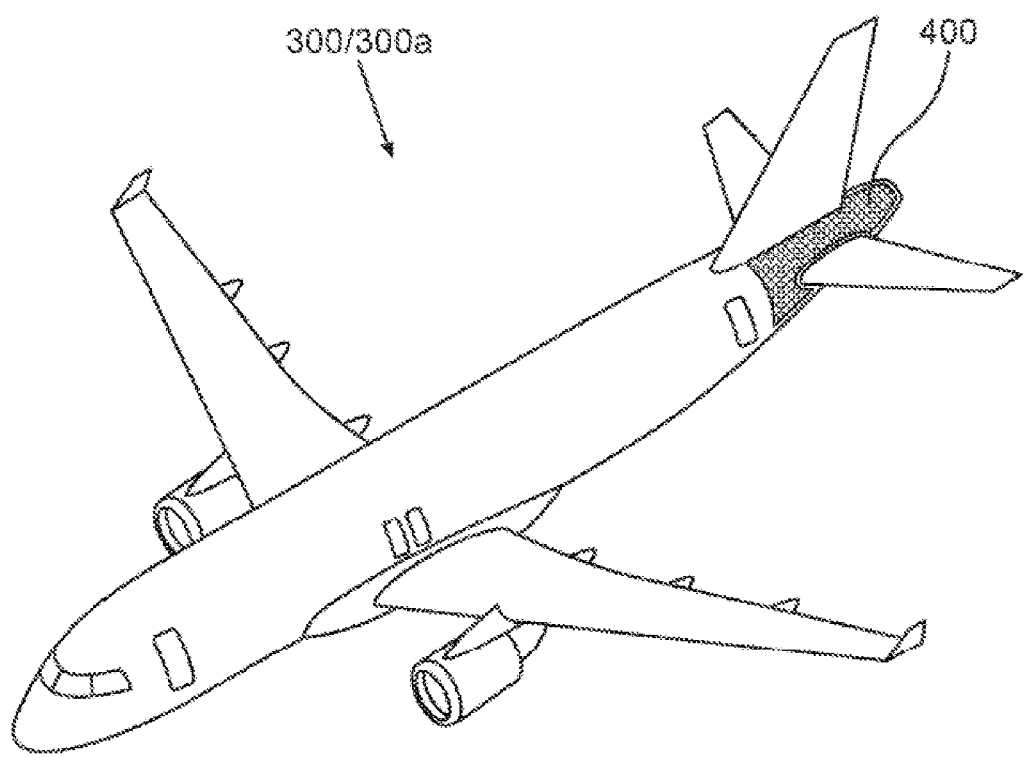
Figure 4:
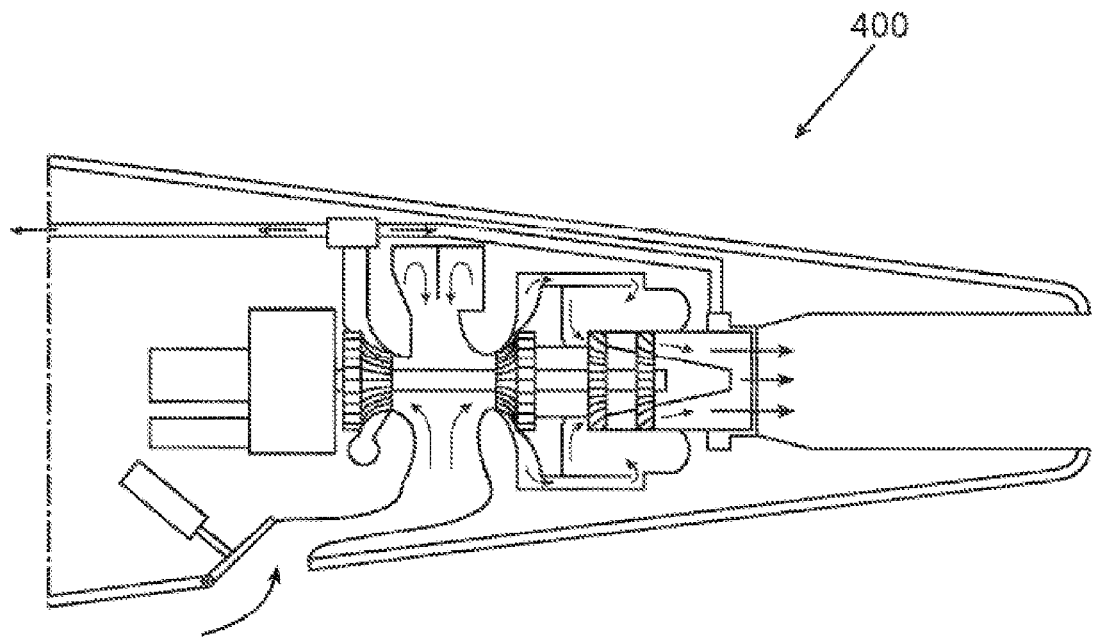

In the drawings:

FIG. 1A schematically illustrates a turboprop engine of an airplane as known in the art;

FIG. 1B schematically illustrates a turboprop engine of an airplane converted to electrical propulsion, in accordance with some exemplary embodiments of the disclosed subject matter;

FIG. 1C schematically illustrates a turboprop engine of an airplane converted to electrical propulsion, in accordance with some other exemplary embodiments of the disclosed subject matter;

FIG. 2A schematically illustrates a turbofan engine of an airplane as known in the art;

FIG. 2B schematically illustrates a turbofan engine of an airplane converted to electrical propulsion, in accordance with some exemplary embodiments of the disclosed subject matter;

FIG. 2C schematically illustrates a turbofan engine of an airplane converted to electrical propulsion, in accordance with some other exemplary embodiments of the disclosed subject matter;

FIG. 3A schematically illustrates an airplane having turbofan engines as known in the art;

FIG. 3B schematically illustrates an airplane converted to electrical propulsion, in accordance with some exemplary embodiments of the disclosed subject matter; and FIG. 4 schematically illustrates an auxiliary power unit (APU) for airplane having engines converted to electrical propulsion, in accordance with some exemplary embodiments of the disclosed subject matter.

DETAILED DESCRIPTION OF THE INVENTION

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

So as to not clutter the drawing and the text, elements and functions of elements that were marked and explained in reference to a figure may be omitted and not repeated in the following figures and their corresponding text.

The present subject matter concerns green energy. The present subject matter provides a method for converting an obsolete conventional airplane to electric propulsion airplane, the method comprises:

removing the conventional power plant of the conventional airplane;

replacing the conventional power plant used for propelling a conventional airplane with an electric motor, wherein said conventional power plant used for propelling the conventional airplane is selected from a group consisting of: turboprop engine and turbofan engine;

removing the at least one fuel tank from the conventional airplane;

placing at least one rechargeable battery instead of the at least one fuel tank, and transferring electrical wiring between the electric motor and the at least one rechargeable battery along the fuel pipes or along the frame elements of the fuselage.

The present subject matter further provides a converted electrical airplane that was converted from prior art airplanes, the converted electrical airplane comprising:

at least one electrical motor for propelling the airplane, wherein said at least one electrical motor replaces at least one conventional power plant used for propelling a conventional airplane, wherein said conventional power plant used for propelling the conventional airplane is selected from a group consisting of: turboprop engine and tubofan engine, wherein at least one rechargeable battery replaces at least one fuel tank of the conventional airplane.

Referring now to FIG. 1A schematically illustrating a turboprop engine of an airplane as known in the art.

For drawing simplicity, only the turboprop engine 100 is seen in this figure; however, it should be noted that at least one, and sometimes a plurality of such turboprop engines is used for propelling an airplane (not seen in this figure). It also should be noted that the airplane includes systems and sub-systems required for operating the engine(s) and the airplane. Some of these systems and sub-systems are seen in FIGS. 3A and 4.

Turboprop engine 100 is housed in a housing 101 having air inlet 102 and gas outlet 103. Air enters the air inlet 102 is compressed by compressor 104. The compressed air enters the combustion chambers 105, where it is mixed with fuel, ignites, and as a result, expands to hot gas. The hot gas rotates the turbine 106 and exits via the gas outlet 103. The turbine 106 rotates shaft 107 that rotates the compressor 104 and reduces transmission 108. Reducing transmission 108 rotates propeller 109 that provides the majority of the thrust that propels the airplane. Some thrust may be created by the exhaust gas exiting the gas outlet 103. Optionally, the pitch of the propeller blades 110 can be controlled at the variable pitch propeller hub 111.

Reducing transmission 108 can power other essential and optional systems that are not seen here as not to clutter the figure. These systems may include: fuel pump and pipes; engine lubrication oil pump; hydraulic and/or pneumatic pumps for actuating control surfaces and/or lowering and retracting the landing gear; electrical generator for powering the flight instrumentation and charging the batteries; etc.

In high flying airplanes, some of the compressed air from compressor 104 can be channeled via a duct 112 to provide near-sea-level compression of the cockpit and the passenger compartment. Alternatively, the fuselage can be uncompressed in low flying airplanes, or be compressed by an auxiliary pump (not seen here).

Referring now to FIG. 1B schematically illustrates a turboprop engine of an airplane converted to electrical propulsion, in accordance with some exemplary embodiments of the disclosed subject matter.

In the converted turboprop engine 100a according to the first exemplary embodiment, the turbojet power generating elements of turboprop engine 100, including the combustion chambers 105, turbine 106, and shaft 107 (shown in FIG. 1A) are removed and replaced with an electric motor 150a. Electrical motor 150a is connected to and rotates the compressor 104 and the reducing transmission 108. Reducing transmission 108 rotates propeller 109 that provides the majority of the thrust that propels the airplane.

Some thrust may be created by the exhaust air formed by compressor 104 and exits the gas outlet 103. The air flow created by the compressor 104 is also used for cooling electric motor 150a, wherein an additional shaft 999 is positioned between the compressor 104 and the electric motor 150a as shown in FIG. 1B. In high flying airplanes, some of the compressed air from compressor 104 can be channeled via a duct 112 to provide near-sea-level compression of the cockpit and the passenger compartment. Alternatively, the fuselage can be uncompressed in low flying airplanes, or be compressed by an auxiliary pump (not seen here).

The pitch of the propeller blades 110 can be controlled at the variable pitch propeller hub 111. Specifically, in depletion of the charge in the batteries or during decent, the pitch of propeller blades 110 is adjusted such that propeller 109 is feathered to reduce drag, or to autorotate, thus rotating the electric motor 150a, which can act as a generator to provide electricity for the airplane systems and recharging the batteries. Alternatively, a separate generator 151a is used for this purpose. Optional aerodynamic cone 152a is added to create laminar flow of the exhaust air.

Reducing transmission 108 can power other essential and optional systems that are not seen here as not to clutter the figure. These systems can include: engine lubrication oil pump; hydraulic and/or pneumatic pumps for actuating control surfaces and/or lowering and retracting the landing gear; electrical generator for powering the flight instrumentation and charging the batteries; etc.

FIG. 1C schematically illustrating a turboprop engine of an airplane converted to electrical propulsion, in accordance with some other exemplary embodiments of the disclosed subject matter.

In the converted turboprop engine 100b according to another exemplary embodiment, the entire turbojet powerplant including compressor 104, combustion chambers 105, turbine 106, and shaft 107 is removed and replaced with an electric motor 150b, wherein additional shaft 999 is positioned between the reducing transmission 108 and the electric motor 150b as shown in FIG. 1C.

The fuselage can be uncompressed in low flying airplanes or be compressed by an auxiliary pump (not seen here).

Original air inlet 102 can be reduced in size to a smaller air intake 102b, for example using an insert, in order to reduce drag by introducing inlet insert 153. Optional aerodynamic cone 152a is added to create laminar flow of the exhaust air.

Referring now to FIG. 2A schematically illustrating a turbofan engine of an airplane as known in the art.

For drawing simplicity, only the turbofan engine 200 is seen in this figure; however, it should be noted that at least one, and sometimes a plurality of such turboprop engines is used for propelling an airplane (not seen in this figure). It should also be noted that the airplane includes systems and sub-systems required for operating the engine(s) and the airplane. Some of these systems and sub-systems are seen in FIGS. 3A and 4.

Turbofan engine 200 is housed in a housing 201 having air inlet 202 and gas outlet 203. Air enters the air inlet 202 is compressed by compressor 204. The compressed air enters the combustion chambers 205, where it is mixed with fuel, ignited, and as a result, expands to hot gas. The hot gas rotates the turbine 206 and exits via the gas outlet 203. The turbine 206 rotates shaft 207 that rotates the compressor 204 and optional reducing transmission 208. Reducing transmission 208 rotates fan 209 that provides the majority of the thrust that propels the airplane. Some thrust is created by the exhaust gas exiting the gas outlet 203. Optionally, electric motor 250b is connected directly to the fan 209 and reducing transmission 208 is missing or removed during the conversion of the airplane to electrical propulsion.

Reducing transmission 208 or shaft 207 can power other essential and optional systems that are not seen here as to not clutter the figure. These systems may include: fuel pump; engine lubrication oil pump; hydraulic and/or pneumatic pumps for actuating control surfaces and/or lowering and retracting the landing gear; electrical generator for powering the flight instrumentation and charging the batteries; etc.

In high flying airplanes, some of the compressed air from compressor 204 can be channeled via a duct 212 to provide near-sea-level compression of the cockpit and the passenger compartment. Alternatively, the fuselage can be uncompressed in low flying airplanes, or be compressed by an auxiliary pump (not seen here).

For ease of converting a prior art airplane of the prior art to electric propulsion, and to save cost, a small number of parts are replaced, and only few modifications are made.

Most of the structure elements and functions of the prior art airplane remain unchanged. For example, at least one of the engines of a conventional airplane is replaced with electrical motor, and at least one fuel tank is replaced with a rechargeable battery to power the electric motor while the wiring between the fuel tank and the electrical motor passes along the fuel pipes that stay intact within the airplane. The wiring can also pass through the frame elements of the airplane such as the bulkheads, the stringers, and the longerons and along the wing attachments and ribs.

Referring now to FIG. 2B schematically illustrating a turbofan engine of an airplane converted to electrical propulsion, in accordance with some exemplary embodiments of the disclosed subject matter.

In the converted turbofan engine 200a according to the first exemplary embodiment, the turbojet power generating elements of turboprop engine 200, including the combustion chambers 205, turbine 206, and shaft 207 are removed and replaced with an electric motor 250a. Electrical motor 250a is connected to and rotates compressor 204 and optional reducing transmission 208, and rotates fan 209 that provides the majority of the thrust that propels the airplane.

Some thrust is created by the exhaust air created by compressor 204 and exiting the gas outlet 203. The air flow created by the compressor 204 is also used for cooling electric motor 250a. In high flying airplanes, some of the compressed air from compressor 204 can be channeled via a duct 212 to provide near-sea-level compression of the cockpit and the passenger compartment. Alternatively, the fuselage can be uncompressed in low flying airplanes, or be compressed by an auxiliary pump (not seen here).

Reducing transmission 208 can power other essential and optional systems that are not seen here so as to not clutter the figure. These systems can include: engine lubrication oil pump; hydraulic and/or pneumatic pumps for actuating control surfaces and/or lowering and retracting the landing gear; electrical generator for powering the flight instrumentation and charging the batteries; etc.

Optionally, a separate generator 251a is used for providing electricity for the airplane systems and recharging the batteries.

Optional aerodynamic cone 252a and/or air flow directing insert 255a are added to create laminar flow of the exhaust air.

Referring now to FIG. 2C schematically illustrating a turbofan engine of an airplane converted to electrical propulsion, in accordance with some other exemplary embodiments of the disclosed subject matter.

In the converted turbofan engine 200 according to another exemplary embodiment, the turbojet power generating elements of turboprop engine 200, including the compressor 204, combustion chambers 205, turbine 206, and shaft 207 are removed and replaced with an electric motor 250b. Electrical motor 250b is connected to and rotates optional reducing transmission 208, and rotates fan 209 that provides the thrust that propels the airplane.

The air flow created by the fan 209 is also used for cooling electric motor 250b. The fuselage can be uncompressed in low flying airplanes, or be compressed by an auxiliary pump (not seen here).

Reducing transmission 208 can power other essential and optional systems that are not seen here as to not clutter the figure. These systems can include: engine lubrication oil pump; hydraulic and/or pneumatic pumps for actuating control surfaces and/or lowering and retracting the landing gear; electrical generator for powering the flight instrumentation and charging the batteries; etc.

Optionally, a separate generator 251b is used for providing electricity for the airplane systems and recharging the batteries.

Optional aerodynamic cone 252b and/or air flow directing insert 255b are added to create laminar flow of the exhaust air.

In FIGS. 2A-2C, the air flow is shown using arrows.

Referring now to FIG. 3A schematically illustrating an airplane having turbofan engines as known in the art.

The figure shows some of the parts of a commercial passenger jet 300 as known in the prior art. Only parts that are important for explaining the current subject matter are marked with numbers. While the airplane 300 depicted in this figure is equipped with four wing-mounted turbofan engines, it should be noted that other configurations such as one, two, three, four, or more engines can be used, and that some engines can be mounted on the fuselage, the base of the tail or the front. Additionally, the engines can be turboprop engines 100 or turbofan engines 200.

Fuel is stored in main fuel tanks 301/302 in the fuselage and the wings respectively, and optionally in an optional aft fuel tank 303. Freight can be stored in a freight hold 304 at the bottom of the fuselage.

FIG. 3B schematically illustrates an airplane converted to electrical propulsion, in accordance with some exemplary embodiments of the disclosed subject matter.

To convert airplane of the prior art 300 to electrically propelled airplane 300a, at least one, and optionally all the engines 100 or 200 are replaced with engines 100a, 100b, or 200a, 200b, respectively (a and b are marked in the Figure as x). The turbofan engines are removed and the electrical engines are implanted instead.

To power the electrically propelled airplane 300a, at least one, and optionally all the main fuel tanks 301 and 302 in FIG. 3A are replaced with rechargeable batteries 351 and 352, as shown in FIG. 3B, respectively.

Optionally, additional rechargeable batteries 354 can be installed in freight hold(s) 304.

Optionally, the optional aft fuel tank 303 is also replaced with a rechargeable batterie 353. However, at least some fuel can be stored, for example in an aft fuel tank in order to power an auxiliary power unit (seen in FIG. 4) used in emergency to provide electrical power and hydraulic pressure.

Fuel pipes 360 that are used to carry fuel from the fuel tanks to the turbofan engines are not being removed from the prior art airplane and instead, they are being cleaned and used to electrically direct and connect the batteries 353 and 354 with the electrical engines 100x and 200x so as to power the engines. The electrical connections are being transferred alongside the fuel pipes 360 or through the frame elements of the airplane, as explained herein before.

It should be emphasized that the connections between the engine and the fuel tanks after the removal of the thermic propulsion motor are replaced by an electrical plug or several electric plugs that are connected to the batteries and other components in the airplane so as to be connected to the electric propulsion motor that is placed beneath the airplane wings instead of the thermic motor.

Referring now to FIG. 4 schematically illustrating an auxiliary power unit (APU) for airplane having conventional engines converted to electrical propulsion engines, in accordance with some exemplary embodiments of the disclosed subject matter.

FIG. 4(i) illustrates the preferred location of APU 400 at the tail of an airplane of the prior art 300 as converted to electrical airplane 300a after implantation of the electrical engine instead of the turbofan engine.

FIG. 4(ii) shows some details of APU 400.

The APU 400 used in the converted electrical airplane 300a can be identical to APU units of the prior art airplanes and can be located at the same location as in an airplane of the art 300.

Although the subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present subject matter.

The invention claimed is:

1. A method for converting a turboprop airplane having at least one combustion engine and at least one fuel tank fluidly connected through fuel pipes to the at least one combustion engine to an electric propulsion airplane, wherein the at least one combustion engine comprises a propeller, a variable pitch propeller hub for controlling the pitch of the propeller, a turbine, a compressor, a reducing transmission connecting the compressor to the propeller, a shaft, and one or more combustion chambers, the method comprising:

removing the turbine, shaft and one or more combustion chambers of the at least one combustion engine from the turboprop airplane;

replacing the turbine, shaft and one or more combustion chambers of the at least one combustion engine used for propelling the turboprop airplane with at least one electric engine having an electric motor;

mechanically connecting the at least one electric engine to the compressor via an additional shaft;

removing the at least one fuel tank from the turboprop airplane;

implanting at least one rechargeable battery instead of the at least one fuel tank; and electrically connecting the at least one electric engine and the at least one rechargeable battery, wherein the mechanically connecting the at least one electric engine to the compressor additionally serves to convert a turboprop airplane having at least one combustion engine to a turboprop-converted airplane suitable for electrically controlling the pitch of the propeller, wherein the at least one electric engine rotates the compressor and the reducing transmission upon depletion of a charge in the at least one rechargeable battery or during descent to control the pitch of the propeller and to thereby urge feathering or autorotation of the propeller, wherein the propeller autorotates in conjunction with the hub during at least one of:

power outage emergency, to cause rotation of the electric motor and generation of electrical power for operation of essential components of the turboprop airplane during the power outage emergency; and descent, to cause rotation of the electric motor and generation of electrical power to charge the at least one rechargeable battery during descent.

2. The method of claim 1, wherein the electrically connecting the at least one electric engine and the at least one rechargeable battery is performed by wiring along the fuel pipes.

3. The method of claim 1, wherein said removing the at least one fuel tank from the turboprop airplane comprises removing main fuel tanks in wings and in fuselage of the turboprop airplane.

4. The method of claim 1, wherein said implanting at least one rechargeable battery comprises implanting the at least one rechargeable battery in wings and in fuselage of the turboprop airplane.

5. The method of claim 1, wherein said implanting at least one rechargeable battery comprises implanting the at least one rechargeable battery in at least one freight hold of the turboprop airplane.

6. The method of claim 1, wherein said implanting at least one rechargeable battery comprises installing the at least one rechargeable battery in a tail section of the turboprop airplane.

7. The method of claim 1, further comprising installing an aerodynamic cone to create laminar flow of exhaust air in an air outlet of the at least one electric engine.

8. The method of claim 1, further comprising the step of fluidly connecting an airflow output of the compressor with a cockpit and a passenger compartment of the electric propulsion turboprop-converted airplane via a duct to facilitate flow of compressed air from the compressor to the cockpit and passenger compartment, wherein the compressor provides near-sea-level compression of the cockpit and passenger compartment.

9. The method of claim 1, further comprising, prior to the replacing step, providing an insert for reducing a size of an air intake at a housing of the turboprop airplane by fixedly attaching the insert to the housing.

10. The method of claim 1, further comprising providing, prior to the replacing step, a fuel operated auxiliary power unit for generating power for operating essential components of the turboprop airplane in emergency and when the at least one rechargeable battery is depleted.

11. A method for converting a turboprop airplane or turbofan airplane having at least one combustion engine and at least one fuel tank fluidly connected through fuel pipes to the at least one combustion engine to an electric propulsion turboprop-converted airplane or turbofan-converted airplane, wherein the at least one combustion engine comprises a compressor, a turbine, a shaft, and one or more combustion chambers, the method comprising:

removing the turbine, shaft and one or more combustion chambers of the at least one combustion engine from the turboprop airplane or turbofan airplane;

replacing the turbine, shaft and one or more combustion chambers of the at least one combustion engine used for propelling the turboprop airplane or turbofan airplane with at least one electric engine;

mechanically connecting the at least one electric engine to the compressor via an additional shaft;

removing the at least one fuel tank from the turboprop airplane or turbofan airplane;

implanting at least one rechargeable battery instead of the at least one fuel tank; and electrically connecting the at least one electric engine and the at least one rechargeable battery.

12. The method of claim 11, further comprising the step of fluidly connecting an airflow output of the compressor with a cockpit and a passenger compartment of the electric propulsion turboprop-converted or turbofan-converted airplane via a duct to facilitate flow of compressed air from the compressor to the cockpit and passenger compartment, wherein the compressor provides near-sea-level compression of the cockpit and passenger compartment.

13. The method of claim 1, further comprising providing, following the replacing step, a fuel operated auxiliary power unit for generating power for operating essential components of the turboprop-converted airplane in emergency and when the at least one rechargeable battery is depleted.

14. The method of claim 11, wherein said removing the at least one fuel tank from the turboprop airplane or turbofan airplane comprises removing main fuel tanks in wings and in fuselage of the turboprop airplane or turbofan airplane.

15. The method of claim 11, wherein said implanting at least one rechargeable battery comprises implanting the at least one rechargeable battery in wings and in fuselage, in at least one freight hold, or in a tail section of the turboprop airplane or of the turbofan airplane.

16. The method of claim 11, further comprising, prior to the replacing step, providing an insert for reducing a size of an air intake at a housing of the turboprop airplane or the turbofan airplane by fixedly attaching the insert to the housing.

17. The method of claim 11, further comprising providing, prior to the replacing step, a fuel operated auxiliary power unit for generating power for operating essential components of the turboprop airplane or turbofan airplane in emergency and when the at least one rechargeable battery is depleted.

* * * * *